US009138815B2

(12) United States Patent
Jansson

(10) Patent No.: US 9,138,815 B2
(45) Date of Patent: Sep. 22, 2015

(54) CUTTING INSERT WITH ANGLED SUPPORTING SURFACE, TOOLHOLDER WITH ANGLED ABUTMENT SURFACE, AND CUTTING TOOL

(71) Applicant: SECO TOOLS AB, Fagersta (SE)

(72) Inventor: Mikael Jansson, Avesta (SE)

(73) Assignee: Seco Tools AB, Fagersta (SE)

( * ) Notice: Subject to any disclaimer, the term of this patent is extended or adjusted under 35 U.S.C. 154(b) by 0 days.

(21) Appl. No.: 14/371,811

(22) PCT Filed: Dec. 20, 2012

(86) PCT No.: PCT/EP2012/076273
§ 371 (c)(1),
(2) Date: Jul. 11, 2014

(87) PCT Pub. No.: WO2013/104506
PCT Pub. Date: Jul. 18, 2013

(65) Prior Publication Data
US 2015/0016900 A1  Jan. 15, 2015

(30) Foreign Application Priority Data

Jan. 13, 2012 (EP) .................................. 12151084

(51) Int. Cl.
B23C 5/20 (2006.01)
B23C 5/22 (2006.01)
B23B 27/16 (2006.01)
(52) U.S. Cl.
CPC ............. *B23C 5/207* (2013.01); *B23B 27/1611* (2013.01); *B23B 27/1622* (2013.01);

(Continued)

(58) Field of Classification Search
CPC .................. Y10T 407/1934; Y10T 407/1936; Y10T 407/23; Y10T 407/245; Y10T 407/2274; Y10T 407/2276; B23C 2200/16; B23C 2200/161; B23C 2200/162; B23C 2200/164; B23C 2200/165; B23C 2200/167
USPC ........... 407/33, 34, 42, 47, 48, 113, 116, 103, 407/104
See application file for complete search history.

(56) References Cited

U.S. PATENT DOCUMENTS 5,158,401 A   10/1992  Pawlik
6,203,251 B1 * 3/2001  Oppelt et al. ................... 407/48

(Continued)

FOREIGN PATENT DOCUMENTS

DE    4304071 C1 *  6/1994
JP    08323510 A  * 12/1996

(Continued)

Primary Examiner — Daniel Howell
Assistant Examiner — Nicole N Ramos
(74) Attorney, Agent, or Firm — Corinne R. Gorski

(57) ABSTRACT

A cutting insert includes two supporting surfaces and four side surfaces located between the two supporting surfaces. Each side surface intersects with two other side surfaces of the four side surfaces to form four corners. The four side surfaces intersect with the two supporting surfaces to form, at two of the four corners, four cutting corners, each cutting corner including a first and a second cutting edge component, and to form, at two other ones of the four corners, four non-cutting corners. Each supporting surface includes a surface portion and an angled supporting surface. A plane of the angled supporting surface intersects with a plane of the surface portion along a line of intersection and forms a non-zero angle with the plane of the surface portion. A toolholder and a cutting tool are also disclosed.

15 Claims, 9 Drawing Sheets

(52) U.S. Cl.
CPC ............... *B23C 5/22* (2013.01); *B23C 5/2213* (2013.01); *B23C 5/2221* (2013.01); *B23C 2200/086* (2013.01); *B23C 2200/165* (2013.01); *B23C 2200/28* (2013.01); *B23C 2210/0407* (2013.01); *B23C 2210/168* (2013.01); *B23C 2210/50* (2013.01); *Y10T 407/1906* (2015.01); *Y10T 407/1936* (2015.01); *Y10T 407/22* (2015.01); *Y10T 407/2276* (2015.01); *Y10T 407/23* (2015.01); *Y10T 407/245* (2015.01)

(56) References Cited

U.S. PATENT DOCUMENTS

| | | | |
|---|---|---|---|
| 7,802,944 B2 * | 9/2010 | Engstrom et al. | 407/66 |
| 2003/0017014 A1 * | 1/2003 | Morgulis et al. | 407/34 |
| 2004/0208713 A1 | 10/2004 | Duerr | |
| 2005/0019119 A1 | 1/2005 | Jager | |
| 2008/0181731 A1 * | 7/2008 | Wallstrom et al. | 407/116 |
| 2010/0054873 A1 * | 3/2010 | Men et al. | 407/42 |
| 2011/0293381 A1 * | 12/2011 | Saji | 407/40 |
| 2013/0156515 A1 * | 6/2013 | Satran et al. | 407/48 |

FOREIGN PATENT DOCUMENTS

| | | | |
|---|---|---|---|
| JP | 2007152552 A | * | 6/2007 |
| JP | 2008188763 A | * | 8/2008 |
| JP | 2011206898 A | * | 10/2011 |
| WO | 2004048021 | | 6/2004 |
| WO | 2009151169 A1 | | 12/2009 |
| WO | 2010067910 A1 | | 6/2010 |
| WO | 2011122676 A1 | | 10/2011 |

* cited by examiner

US 9,138,815 B2

CUTTING INSERT WITH ANGLED SUPPORTING SURFACE, TOOLHOLDER WITH ANGLED ABUTMENT SURFACE, AND CUTTING TOOL

RELATED APPLICATION DATA

This application is a §371 National Stage Application of PCT International Application No. PCT/EP2012/076273 filed Dec. 20, 2012 claiming priority of EP Application No. 12151084.6, filed Jan. 13, 2012.

BACKGROUND AND SUMMARY

The present invention relates to cutting inserts, toolholders, and cutting tools preferably for machining metallic materials.

Aspects of the invention have application to cutting inserts, toolholders, and cutting tools used in rotating tool applications as well as turning applications. Aspects of the invention will hereinafter be described primarily in terms of their use in rotating tool applications, however, persons skilled in the art will appreciate that the description typically applies as well to turning tool applications, except where otherwise noted.

It is often desirable to mount cutting inserts on abutment surfaces of a toolholder that form negative holding angles. This may be done to, for example, facilitate provision of more inserts on a toolholder than might be possible if some other configuration were used, or to facilitate orientation of inserts so that they form negative rake angles with workpieces.

Cutting inserts are often mounted to toolholders via bolts or screws that extend through holes in the cutting inserts and mate with threaded holes in the toolholder. When cutting inserts are mounted on abutment surfaces having negative holding angles, these bolts can be subjected to substantial shearing forces. Accordingly, it is desirable to provide a cutting tool and a toolholder and insert therefor that facilitates mounting of inserts to supporting surfaces having negative holding angles in a manner and via structures for accounting for the high shearing forces.

For purposes of the present discussion, a surface of a cutting insert that supports the insert relative to a surface of a toolholder (or other structure such as a shim attached to the toolholder) is referred to and defined as a "supporting surface". The surface of the toolholder that abuts the supporting surface shall, for purposes of the present discussion, be referred to and defined as an "abutment surface".

For purposes of the present discussion, a "holding angle" is a generic term that can refer to either an axial holding angle or a radial holding angle, or both, and is defined as and refers to a characteristic of an abutment surface of the toolholder. By contrast, for purposes of the present discussion, the angle of a supporting surface of a cutting insert that contacts the abutment surface will be referred to and defined as the "held angle".

In the context of a rotating tool, a negative axial holding angle $\alpha$ is defined for purposes of the present discussion as follows: as shown schematically in FIG. 1A, a bottom surface shall be considered, for purposes of the present discussion, define a "negative axial holding angle" $\alpha$ with a plane PA parallel to and extending through the longitudinal axis of the toolholder T when, for a tool that is designed to cut when rotated in a counter clockwise direction as illustrated in FIG. 1A, when the tool is viewed from the side, an axially extending edge SAE of a plane of the bottom abutment intersects with the plane PA at an upper point UP of the edge SAE surface and slopes downward toward the bottom of the toolholder from left to right to a lower point LP of the edge. In a tool designed to cut when rotated in a clockwise direction (not shown), the axially extending edge of the plane of the bottom surface slopes downward toward the bottom of the toolholder from right to left. By contrast, FIG. 1B schematically shows a bottom surface forming what shall be considered, for purposes of the present discussion, to be a "positive axial holding angle" $\alpha$ wherein an axially extending edge SAE of a bottom surface slopes downward toward the bottom of the toolholder T from right to left from the upper point UP to the lower point LP of the edge of a tool that is designed to cut when rotated in a counter clockwise direction.

In the context of a rotating tool, a negative radial holding angle $\rho$ is defined for purposes of the present discussion as follows: as shown schematically in FIG. 1C, a bottom surface shall be considered, for purposes of the present discussion, define a "negative radial holding angle" with a plane PA parallel to and extending through the longitudinal axis of the toolholder T when, for a tool that is designed to cut when rotated in a counter clockwise direction as illustrated in FIG. 1C, when the tool is viewed from the bottom, a radially extending edge SRE of a plane of the bottom surface intersects with the plane PA at an inner point IP on the edge SRE and slopes rearwardly of the plane PA to an outer point OP. In a tool designed to cut when rotated in a clockwise direction (not shown), the radially extending edge of the plane of the bottom surface slopes forward of the plane. By contrast, FIG. 1D schematically shows a bottom surface forming what shall be considered, for purposes of the present discussion, to be a "positive radial holding angle" wherein a radially extending edge SRE of a bottom surface slopes forward of the plane PA from the inner point IP on the edge SRE toward the outer point OP for a tool that is designed to cut when rotated in a counter clockwise direction.

In the context of a rotating tool, a zero axial or radial holding angle $\alpha$ or $\rho$ is defined for purposes of the present discussion as when the axially extending edge SAE or the radially extending edge SRE lie on or are parallel with a plane PA passing through the longitudinal axis.

In the context of either a rotating tool or a turning tool, a rake angle is the angle of the cutting face of the insert relative to the workpiece. An insert I has a positive rake angle when its cutting face C forms an angle with the workpiece W as shown in FIG. 2A; a negative rake angle when its cutting face C forms an angle with the workpiece W as shown in FIG. 2B; and a zero or neutral rake angle when its cutting face C is perpendicular to the workpiece as shown in FIG. 2C. As seen in FIG. 2D, the geometry of the cutting face C by the cutting edge E can be modified so that a cutting face oriented so that a plane PC of the cutting face is negative or zero with respect to the workpiece can nonetheless have a portion by the cutting edge E that forms a positive angle with the workpiece. An insert arranged to provide a positive rake angle will ordinarily cut a workpiece more easily than an insert arranged to provide a negative rake angle. An insert arranged to provide a negative rake angle will ordinarily be less likely to break than an insert arranged to provide a positive rake angle.

For purposes of the present discussion, the "plane" of a non-planar surface is defined as a plane roughly parallel with or through an average level of the points on the non-planar surface.

According to an aspect of the present invention, a cutting insert comprises two supporting surfaces, four side surfaces between the two supporting surfaces, each side surface of the four side surfaces intersecting with two other side surfaces of the four side surfaces to form four corners, the four side surfaces intersecting with the two supporting surfaces to form, at two of the four corners, four cutting corners, each cutting corner comprising a first and a second cutting edge component, and to form, at two other ones of the four corners, four non-cutting corners, characterized in that each supporting surface comprises a surface portion and an angled supporting surface, a plane of the angled supporting surface intersecting with a plane of the surface portion along a line of intersection and forming a non-zero angle with the plane of the surface portion, wherein the line of intersection on a first one of the two supporting surfaces is substantially perpendicular to the line of intersection on a second one of the two supporting surfaces.

According to another aspect of the invention, a toolholder for a rotating cutting tool comprises a toolholder body having a longitudinal axis, at least one cutting insert receiving pocket in the toolholder body, the at least one pocket comprising at least one bottom surface, the at least one bottom surface being oriented at a negative holding angle, characterized in that the toolholder comprises at least one angled abutment surface in the at least one bottom surface, the at least one angled abutment surface and the at least one bottom surface being oriented at a non-zero abutment surface angle relative to each other, and in that the abutment surface angle is substantially equal to or greater than, and opposite from, a holding angle at which the at least one bottom surface is oriented so that the at least one angled abutment surface is oriented at a substantially neutral or positive holding angle.

According to another aspect of the invention, a cutting tool comprises a toolholder for a rotating cutting tool, comprising a toolholder body having a longitudinal axis, at least one cutting insert receiving pocket in the toolholder body, the at least one pocket comprising at least one bottom surface, the at least one bottom surface being oriented at a negative holding angle, and a cutting insert mounted in the cutting insert receiving pocket, the cutting insert comprising at least one supporting surface facing the at least one bottom surface, characterized in that the toolholder comprises at least one angled abutment surface in the at least one bottom surface and in that the insert comprises at least one surface portion and at least one angled supporting surface in the at least one supporting surface, the at least one angled abutment surface and the at least one bottom surface being oriented at a non-zero abutment surface angle relative to each other, and the at least one angled supporting surface and the at least one surface portion being oriented at a non-zero supporting surface angle relative to each other, the at least abutment surface angle and the at least one supporting surface angle being equal, and in that the abutment surface angle is substantially equal to or greater than, and opposite from, a holding angle at which the at least one bottom surface is oriented so that the at least one angled abutment surface is oriented at a substantially neutral or positive holding angle.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

A rotating cutting tool 21 (FIG. 4) according to an aspect of the present invention has a toolholder 23 as shown in FIGS. 3A-3G. As seen in FIG. 4, in the cutting tool 21, one or more cutting inserts 25 (e.g., FIGS. 5A-5D and 6A-6C) are mounted to the toolholder 23. Ordinarily, the cutting inserts 25 are indexable to more than one position. In a particularly preferred embodiment, the inserts 25 are double-sided inserts and are indexable to four cutting positions.

Figure 1A:
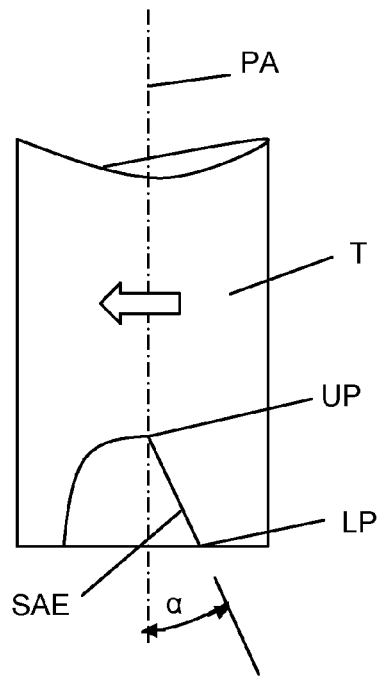
FIGS. 1A and 1B are schematic side views illustrating prior art toolholders with abutment surfaces having negative and positive axial holding angles, respectively.
Figure 1B:
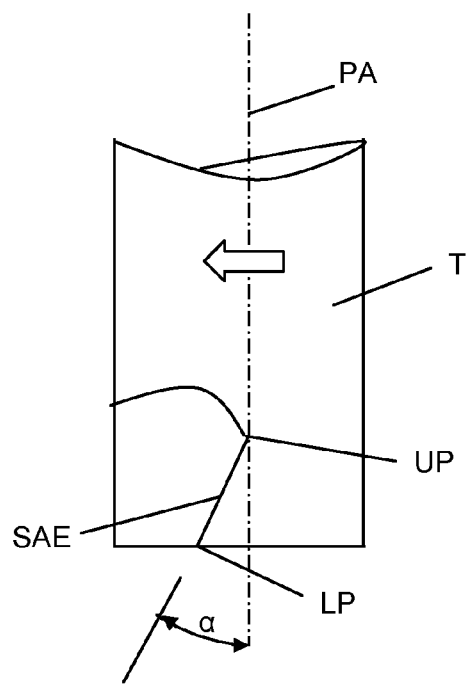
Figure 1C:
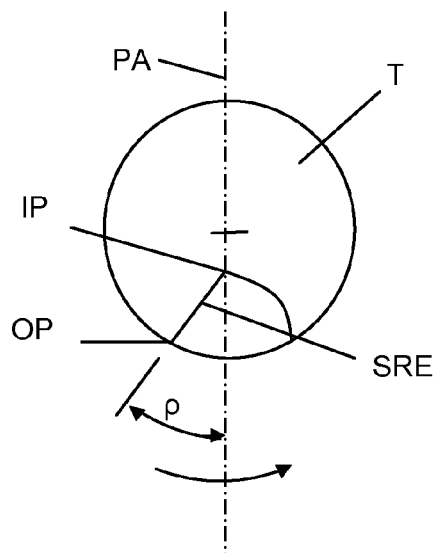
FIGS. 1C and 1D are schematic end views illustrating prior art toolholders with abutment surfaces having negative and positive radial holding angles, respectively.
Figure 1D:
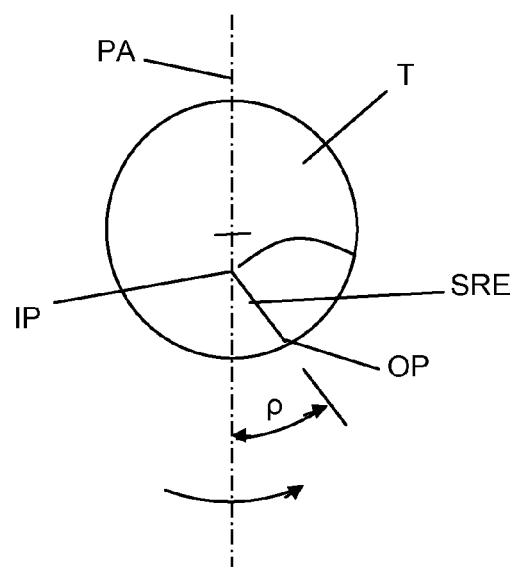
Figure 2A:
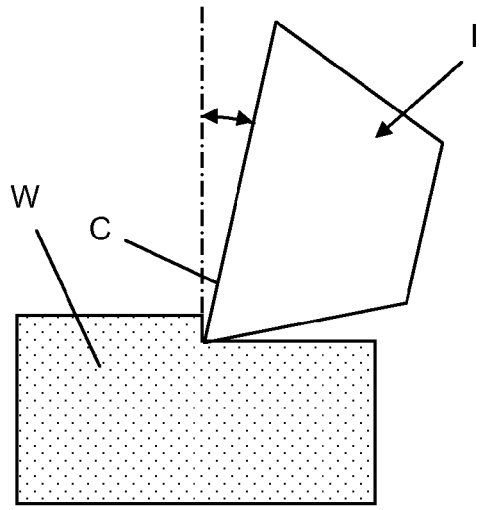
FIGS. 2A, 2B, 2C, and 2D are partial cross-sectional schematic views of prior art arrangements illustrating positive, negative, zero, and positive rake angles, respectively.
Figure 2B:
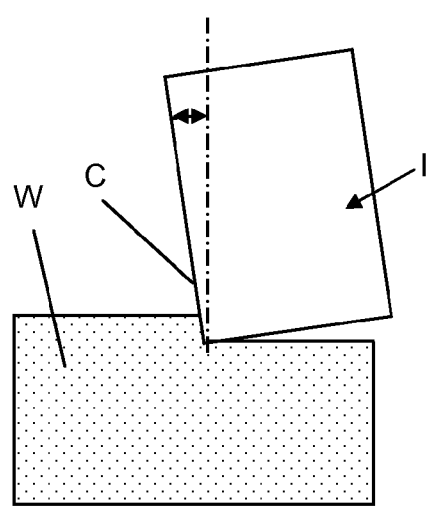
Figure 2C:
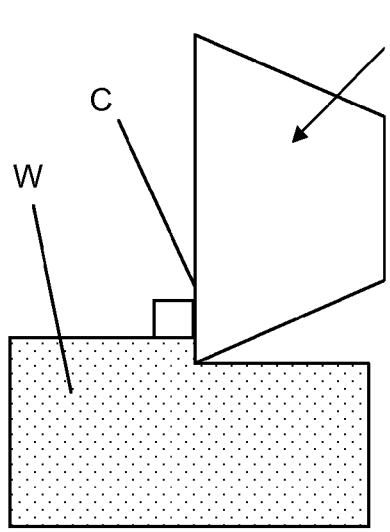
Figure 2D:
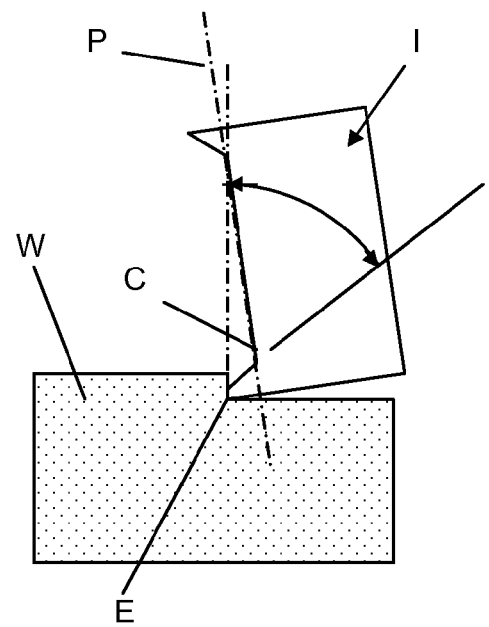
Figure 3A:
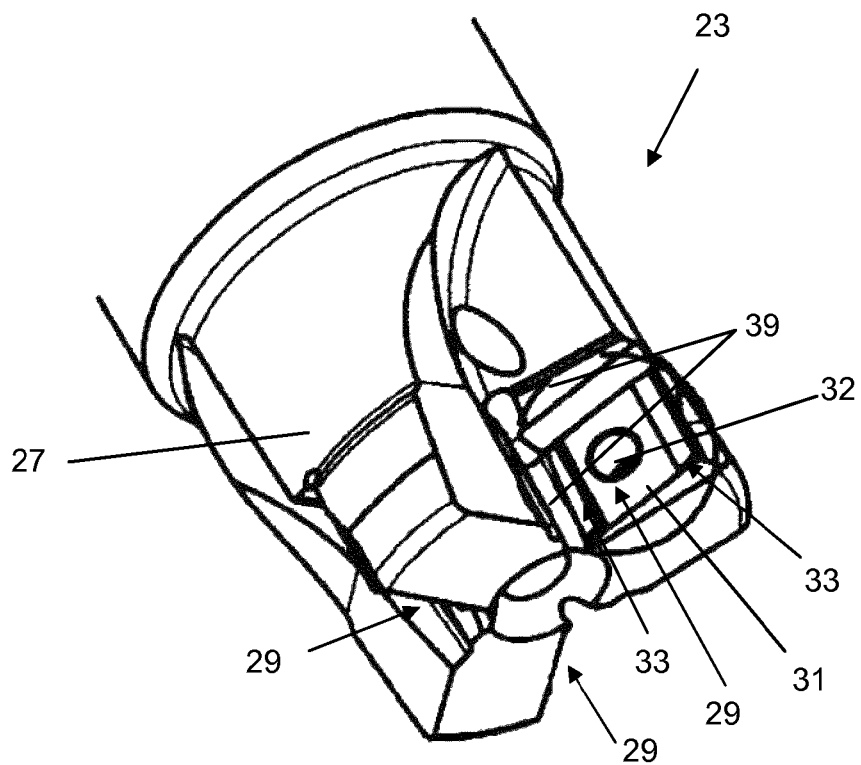
FIG. 3A is a perspective view of a toolholder according to an aspect of the present invention.
Figure 3B:
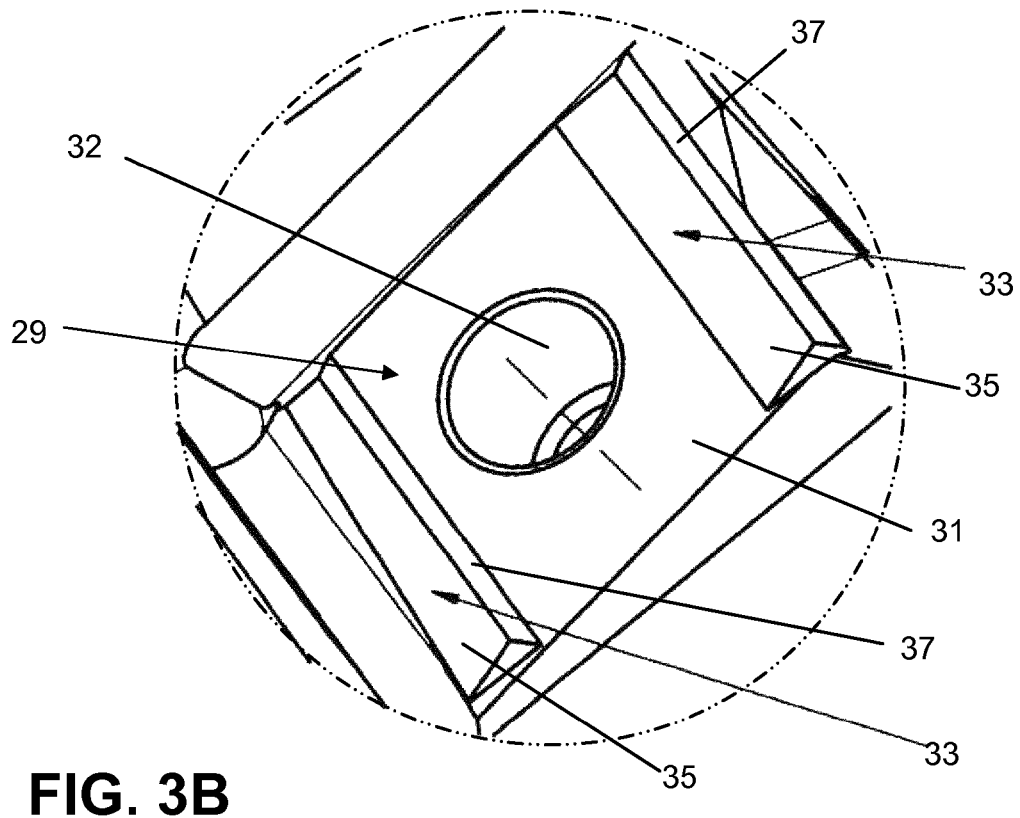
FIG. 3B is an enlarged view of a portion of the toolholder of FIG. 3A.
Figure 3C:
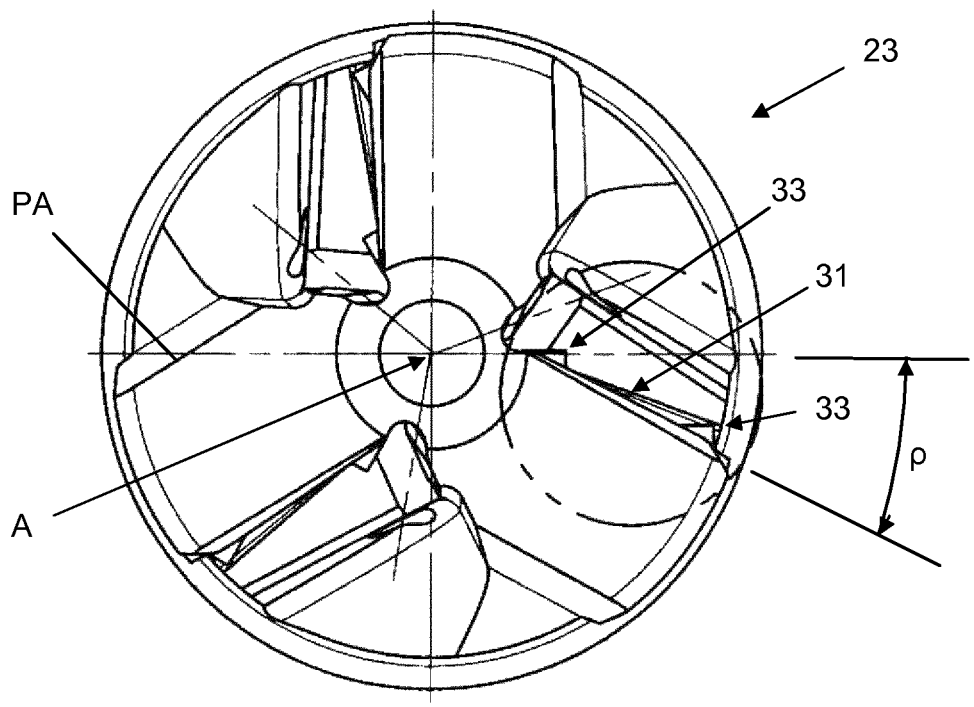
FIG. 3C is an end view of the toolholder of FIG. 3A.
Figure 3D:
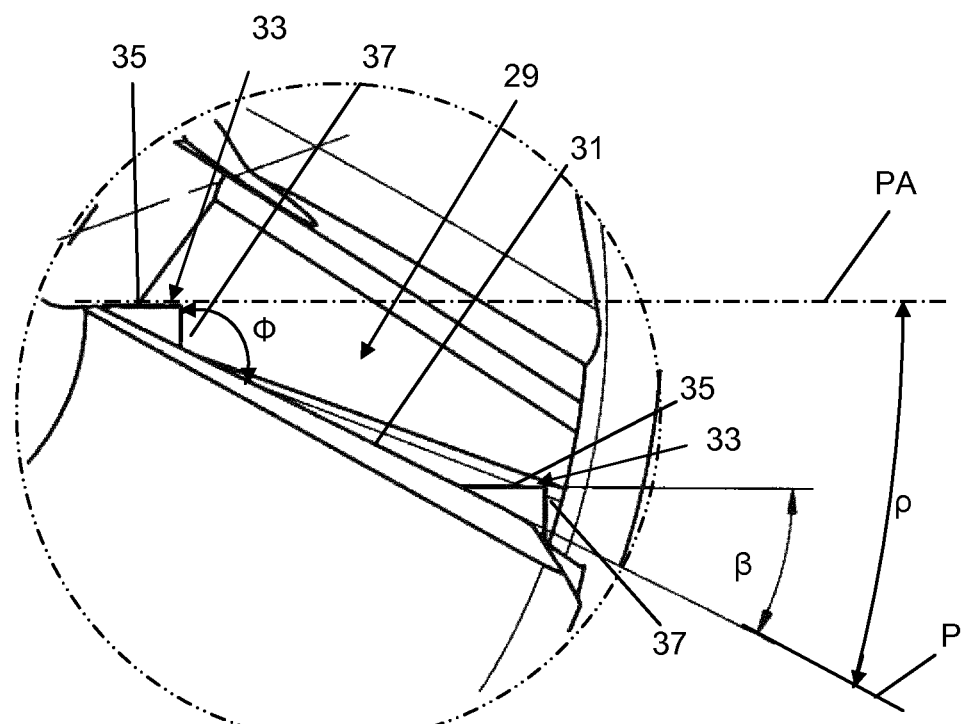
FIG. 3D is an enlarged view of a portion of the toolholder of FIG. 3C.
Figure 3E:
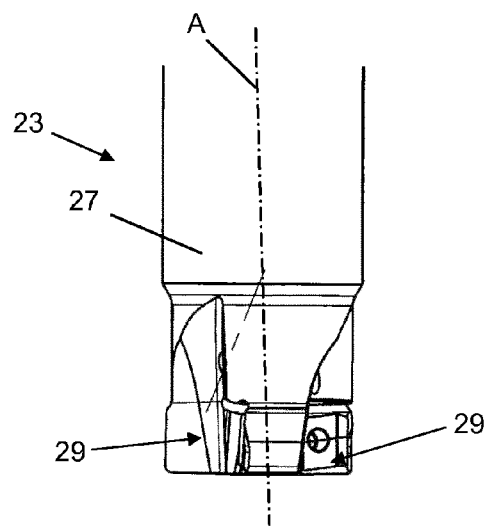
FIG. 3E is a side view of the toolholder of FIG. 3A.

The toolholder 23, seen in various views in FIGS. 3A-3G, comprises a toolholder body 27 and has a longitudinal axis A (FIG. 3E). The toolholder 23 comprises at least one cutting insert receiving pocket 29 in the toolholder body 27, and ordinarily a plurality of insert receiving pockets at different circumferential and/or axial positions on the toolholder body. Three pockets are shown in FIGS. 3A and 3C.

The pocket 29 comprises at least one bottom surface 31 (seen in greater detail in FIGS. 3B, 3D, and 3F) that is oriented at a negative holding angle. In an aspect of the present invention, an insert 25 can be shaped so that, even though it is mounted in a pocket having a negative radial holding angle $\rho$ and/or axial holding angle $\alpha$, its rake surface can be held at a positive radial and/or axial rake angle relative to a workpiece. Of course, the insert might instead be shaped so that it has a negative radial and/or axial rake angle. In an aspect of the present invention, a pocket 29 has a negative, positive, or zero axial holding angle $\alpha$ and a negative radial holding angle $\rho$, and an insert 25 in the pocket has a geometry such that it has a positive or zero axial rake angle 8 and a positive radial rake angle (not shown).

Figure 3F:
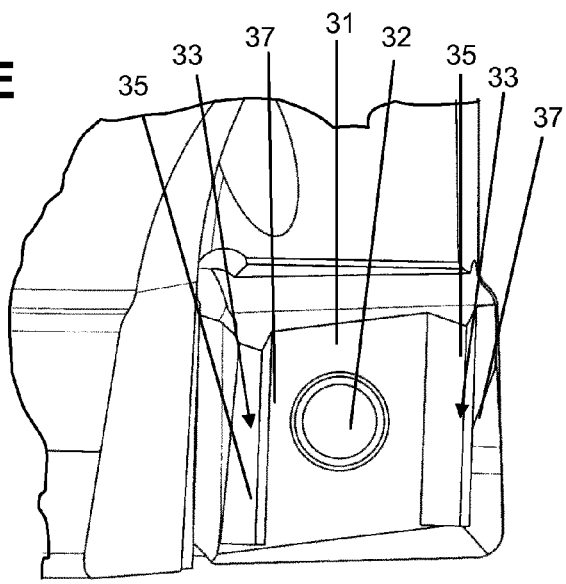
FIG. 3F is an enlarged view of a portion of the toolholder of FIG. 3E.
Figure 3G:
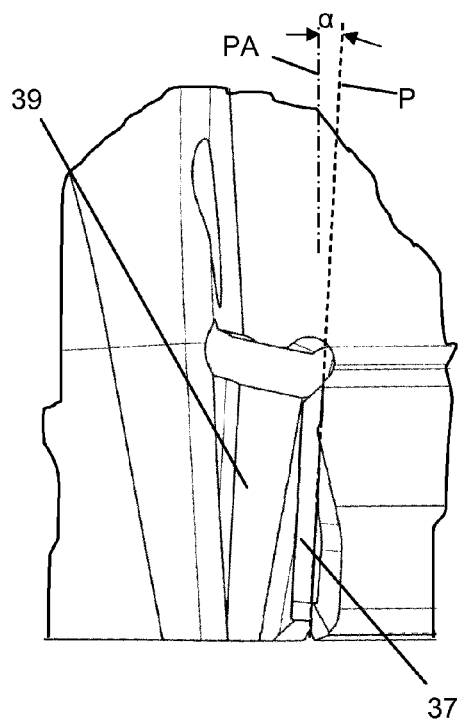
FIG. 3G is an enlarged view of a portion of the toolholder of FIG. 3E.
Figure 4:
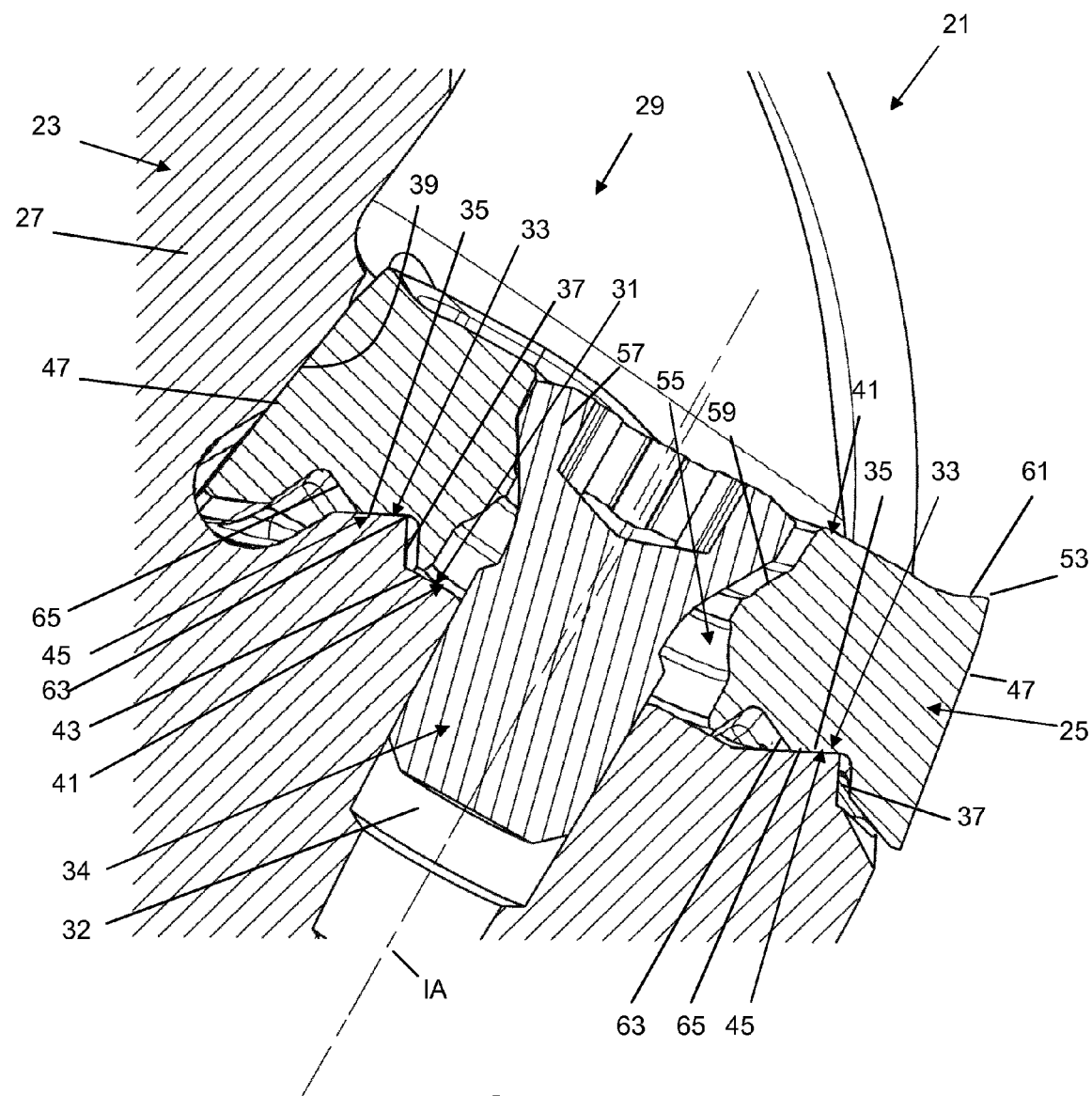
FIG. 4 is a cross-sectional view of a portion of a cutting tool according to an aspect of the present invention.

In the embodiment shown in FIGS. 3A-3G, the bottom surface 31 defines a negative radial holding angle $\beta$ (FIG. 3C) with the plane PA of the longitudinal axis A. The same bottom surface 31 can form a negative, positive (as seen in FIG. 3G), or zero axial holding angle $\alpha$.

The pocket 29 further includes at least one angled abutment surface 33 in the bottom surface 31. The angled abutment surface 33 and the bottom surface 31 are oriented at a non-zero abutment surface angle $\beta$ (FIG. 3D) relative to each other. The angled abutment surface 33 can define with the bottom surface 31 an angle β substantially equal to or greater than, and opposite from, the negative holding angle at which the bottom surface is oriented so that the angled abutment surface is oriented at a substantially neutral or positive holding angle. In a presently preferred embodiment of the toolholder 23, the bottom surface 31 forms a negative radial holding angle ρ of 26°, and the angled abutment surface 33 forms an angle β with the bottom surface that is also equal to 26° so that the angled abutment surface forms a zero radial holding angle as seen in FIGS. 3C and 3D.

As seen, for example, in FIGS. 3B and 3F, a hole 32 can extend into the bottom surface 31. The hole 32 can be internally threaded for mating with an externally threaded bolt 34 (FIG. 4) that secures the insert 25 in the pocket 29. The hole 32 will ordinarily extend at an angle substantially perpendicular to a plane P of the bottom surface 31. By providing an angled abutment surface 33 that defines with the bottom surface 31 an angle β substantially equal to or greater than, and opposite from, the negative holding angle at which the bottom surface 31 is oriented, the angled abutment surface oriented at the substantially neutral or positive holding angle can provide additional support to resist forces on the insert that might otherwise tend to damage the bolt 34. Instead of clamping the insert 25 using a bolt, other arrangements such as a clamping arm might be used. The provision of the angled abutment surface 33 facilitates holding the insert 25 in place in the pocket 29 substantially regardless what kind of clamping arrangement is used. The angled abutment surfaces 33 in one pocket 29 (shown in FIG. 3B) are elongated and their major axes may extend parallel to each other spaced about the hole 32. By the term "parallel" in that connection is meant that the two major axes do not intersect in a plane. A line through the center of the hole 32 may be perpendicular to said major axes.

The cutting insert can be manufactured from directly pressed cemented carbide. By the term "cemented carbide" is here meant WC, TiC, TaC, NbC, etc., in sintered combination with a binder metal such as, for instance, Co or Ni. The cutting insert is preferably at least partly coated with layers of, e.g., Al2O3, TiN and/or TiCN. In certain cases, it may be justified that the cutting edges comprise soldered superhard materials such as CBN or PCD.

As seen, for example, in FIGS. 3B, 3D, and 3F, the angled abutment surface 33 can comprise a first surface portion 35 that defines with the bottom surface 31 a first angle β and a second surface portion 37 that defines with the bottom surface a second angle ϕ (FIG. 3D) that is different from the first angle. The second angle ϕ can be opposite from and equal to or, preferably, greater than the first angle β so that second surface portion defines a negative holding angle that is equal to or greater than twice as large as the negative holding angle of the bottom surface 31. The two first surface portions 35 in one bottom surface 31 may be substantially parallel, see FIG. 3D. As seen in FIG. 4, providing the second angle ϕ of the second surface portion 37 at a larger angle than the first angle β of the first portion 33 can be useful to prevent the second surface portion 37 from interfering with surfaces (63 and 65) on the insert 25.

The angled abutment surfaces 33 and the first and second surfaces portions 35 and 37 can be elongated, ordinarily flat, surfaces such as are shown in, e.g., FIGS. 3B and 3F, however, they may have other shapes. For example, they may be in the shape of one or more pyramids, truncated pyramids, ridges, or serrations.

If space permits, the bottom surface 31 will ordinarily have at least two angled abutment surfaces 33. Ordinarily, but not necessarily, the first portions 35 of two angled abutment surfaces 33 are oriented at the same angle β relative to the bottom surface 31, and the second portions 37 of the two angled abutment surfaces are oriented at the same angle ϕ relative to the bottom surface.

As seen, for example, in FIGS. 3A and 3G, the pocket 29 ordinarily also comprises at least two side abutment surfaces 39 that forms a non-zero angle with the at least one bottom surface 31. The at least two side abutment surfaces 39 are non-parallel to each other. Side supporting surfaces on side surfaces of the insert 25 support the insert against the side abutment surfaces.

FIGS. 4, 5A-5D, and 6A-6C show a cutting insert 25 according to an aspect of the present invention that is particularly well-suited for use in a toolholder 23 as described herein. The insert 25 can be a single-sided or a double-sided cutting insert. For purposes of discussion, a double-sided insert is described.

The insert 25 is particularly well-suited for mounting in the toolholder 23 that comprises the toolholder body 27 having a longitudinal axis A, at least one cutting insert receiving pocket 29 in the toolholder body, the at least one pocket comprising at least one bottom surface 31, the at least one bottom surface being oriented at a negative holding angle, and at least one angled abutment surface 33 in the at least one bottom surface, the at least one angled abutment surface and the at least one bottom surface being oriented at an angle β relative to each other.

For a double-sided insert 25, the insert is receivable in the pocket 29 and is ordinarily indexable to at least four positions relative to the pocket. The double-sided insert 25 includes two identical supporting surfaces 41 on opposite sides of the insert. Each supporting surface 41 comprises a surface portion 43 for facing towards the bottom surface 31 and an angled supporting surface 45 for contacting the angled abutment surface 33. There may be a gap between the surface portion 43 and the bottom surface 31 to avoid four point contacts.

In the illustrated embodiment, four identical side surfaces 47 extend between the two supporting surfaces 41. In other embodiments (not shown), additional side surfaces might be provided. At least parts of the side surfaces 47 function as side supporting surfaces and abut the side abutment surfaces 39 in the pocket 29. The four side surfaces 47 defining with the two supporting surfaces 41 four cutting corners 49. Each cutting corner 49 has a first edge component 51 defined by an intersection of a first one of the four side surfaces 47 with one of the two supporting surfaces 41 and a second edge component 53 defined by an intersection of a second one of the four side surfaces with the one of the two supporting surfaces. The first one of the four side surfaces 47 forms an acute angle Σ (FIG. 5B) with a plane PSS of the surface portion 43 of the one of the two supporting surfaces 41 with which the first one of the four side surfaces forms the first edge component 51. The second one of the four side surfaces 47 forms an obtuse angle ψ (FIG. 5B) with the plane PSS of the surface portion 43 of the one of the two supporting surfaces 41 with which the second one of the four side surfaces forms the second edge component 53. The side surfaces 47 can be, but need not be, substantially planar. In the tool shown in FIG. 4, a portion 47a of the side surface 47 closest to the second edge component 53 forms a larger angle with the surface portion 43 than the rest of the side surface. In this tool, the first edge component 51 is a generally radially extending edge, also referred to as a radial cutting edge, and the second edge component 53 is a generally axially extending edge, also referred to as an axial cutting edge. The insert 25 can be provided with a geometry such that a wedge angle defined by surface portions of the supporting surfaces 41 immediately inward of one or, ordinarily, both of the first and second cutting edge components 51 and 53 is an acute angle, even though the plane PSS of the surface portion 43 might form an obtuse angle with the side surface by the cutting edge component.

The insert 25 ordinarily comprises a hole 55 extending through the insert and being adapted to align with the hole 32 in the toolholder 23 when the insert is received in the pocket 29. The bolt 34 extends through the hole 55 in the insert 25 and has threads that mate with threads of the hole 32 in the toolholder. A lower portion of the head 57 of the bolt 34 contacts the insert 25, usually contacting an angled surface 59 of the hole 55 so that the head of the bolt does not extend above the supporting surface 41 of the insert.

As seen in FIG. 3C, the at least one bottom surface 31 can define, for example, a negative radial holding angle $\rho$ with a plane PA of the longitudinal axis A. As seen in FIG. 4, the insert 25 can comprise an axial cutting edge 53 and rake surface 61 shaped so that, when the insert is received in the at least one pocket 29, the rake surface along the axial cutting edge is held at a positive or zero rake angle. By providing an insert 25 with a geometry wherein the edge surface 47 and the surface portion 43 along the axial cutting edge 53 form an obtuse angle $\psi$ and the rake surface 61 along that axial cutting edge is shaped so that, when the insert is mounted in a pocket 29 having a bottom surface 31 with a negative radial holding angle $\rho$, the rake surface along the axial cutting edge forms a positive or zero axial rake angle $\theta$ with a workpiece, the resulting tool 21 provides a highly desirable combination of cutting properties and strength.

In the toolholder 23, the angled abutment surface 33 defines with the bottom surface 31 the abutment surface angle $\beta$ that is substantially equal to or greater than, and opposite from, the negative holding angle at which the bottom surface is oriented so that the angled abutment surface is oriented at a substantially neutral or positive holding angle. A plane PAS (see, e.g., FIG. 5D) of the angled supporting surface 45, in turn, preferably intersects with a plane PSS of the surface portion 43 along a line of intersection LI defines a supporting surface angle $\beta'$ with the surface portion 43 equal to the abutment surface angle $\beta$ so that the angled supporting surface 45 will be in surface-to-surface contact with the angled abutment surface 33.

Figure 5A:
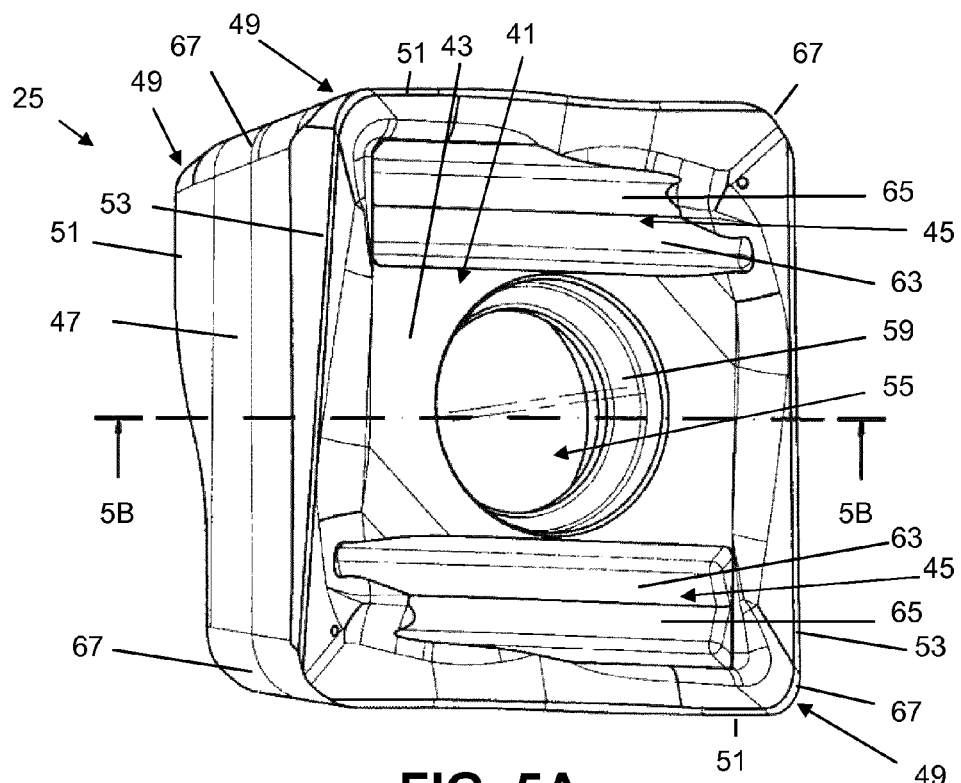
FIG. 5A is a perspective view of a cutting insert according to an aspect of the present invention.
Figure 5B:
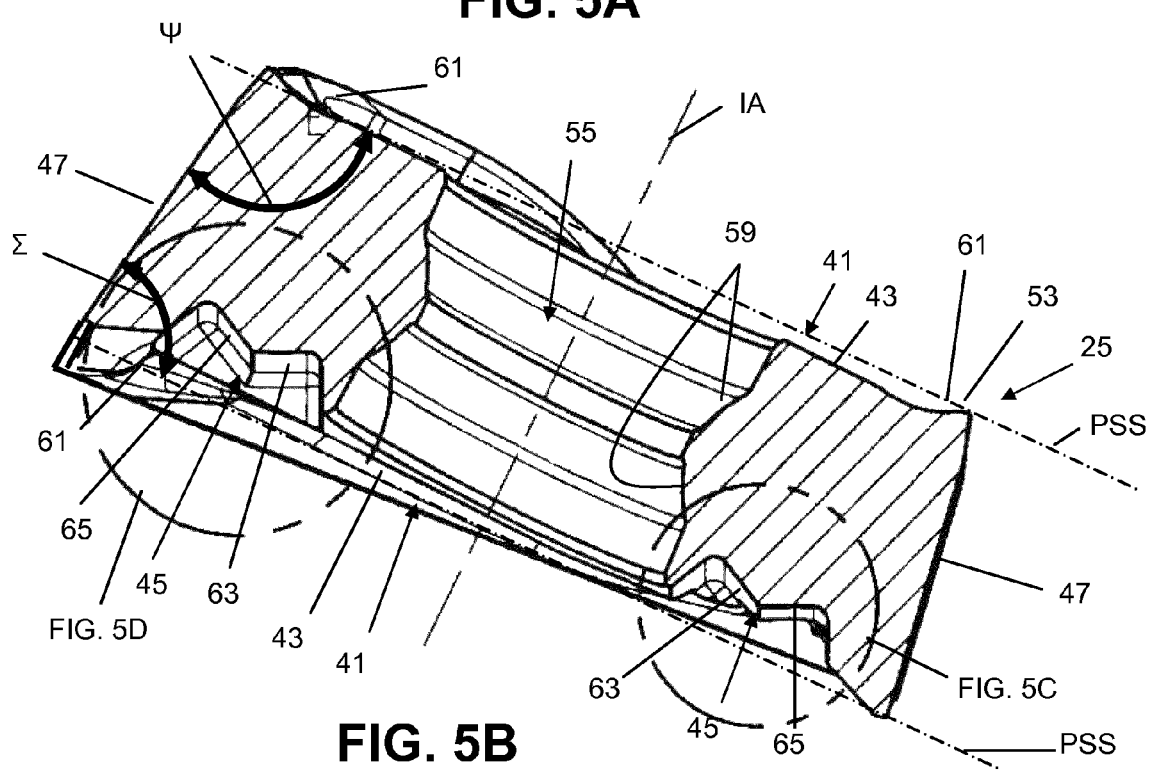
FIG. 5B is a cross-sectional view of the cutting insert of FIG. 5A taken at section 5B-5B.
Figure 5C:
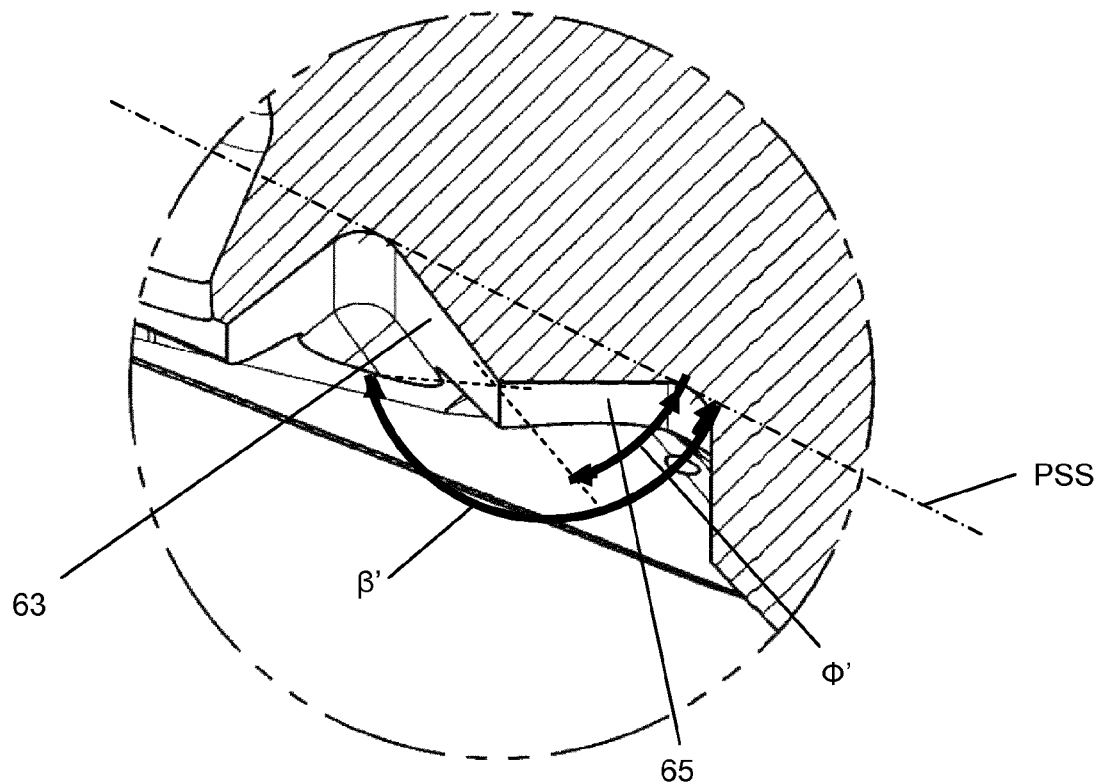
FIGS. 5C and 5D are enlarged views of portions of the cross-sectional view of FIG. 5B.
Figure 5D:
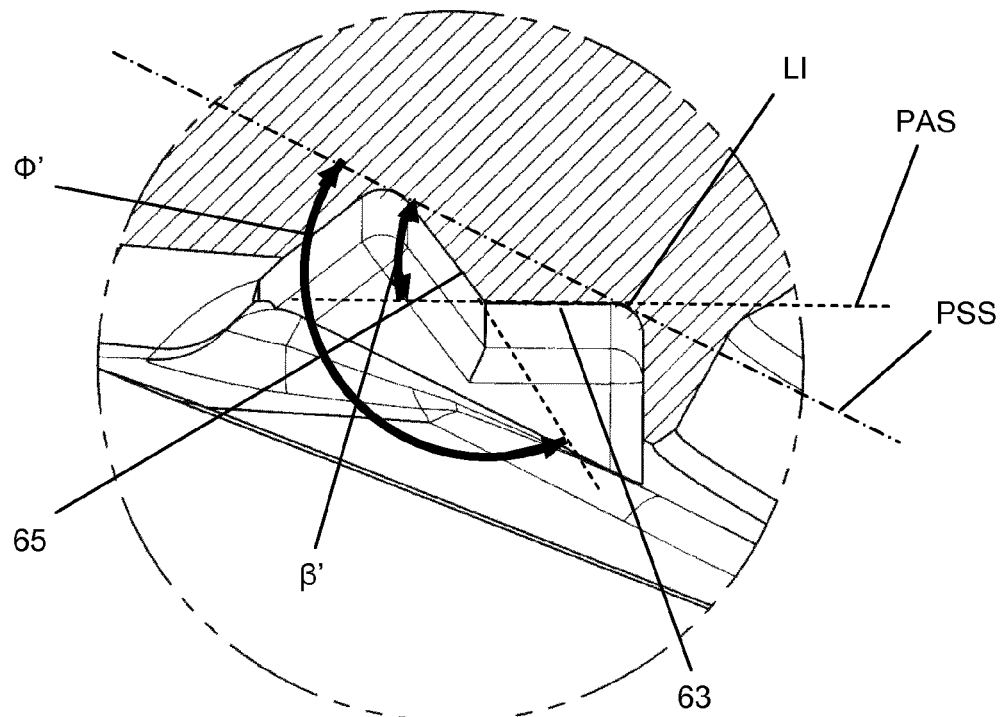

As seen in FIGS. 5C and 5D, the angled supporting surface 45 ordinarily comprises a first surface portion 63 that defines with the surface portion 43 (or the plane PSS of the surface portion as shown in FIGS. 5C and 5D which, for purposes of the present discussion, shall be considered to be the same thing as the surface portion, even though the supporting surface need not be planar) the supporting surface angle $\beta'$ and a second surface portion 65 that defines with the surface portion (or the plane PSS of the surface portion) a second angle $\phi'$ that is different from the supporting surface angle. When measured relative to the plane PSS of the surface portion, or where the surface portion 43 is generally planar, the second angle $\phi'$ is ordinarily equal to 180° minus the supporting surface angle $\beta'$. The second surface portion 65 is disposed further from a center of the insert 25 than the first surface portion.

If space permits, each supporting surface 41 of the insert will ordinarily include at least two angled supporting surfaces 45 in the surface portion 43. The at least two angled supporting surfaces 45 are oriented at least at one angle $\beta'$ relative to the surface portion 43 and can be mutually parallel and spaced apart about a center of the cutting insert. The at least two angled supporting surfaces 45 will ordinarily be oriented at the same angle $\beta'$ relative to the surface portion.

FIG. 4 shows how an insert 25 with a pair of angled supporting surfaces 45 with first and second surface portions 63 and 65 can be arranged to facilitate indexing of the insert 25. The insert 25 can be seated in the pocket 29 so that the first surface portion 63 of a first one of the angled supporting surfaces 45 is in surface-to-surface contact with the first portion 35 of a radially innermost one of the angled abutment surfaces 33 and the second surface portion 65 of that first one of the angled supporting surfaces 45 will be spaced from the second portion 37 of that innermost one of the angled abutment surfaces. For the second one of the angled supporting surfaces 45 (closer to the exterior of the toolholder 23) the second surface portion 65 of that second one of the angled supporting surfaces 45 is in surface-to-surface contact with the first portion 35 of the radially outermost one of the angled abutment surfaces 33 and the first surface portion 63 of that second one of the angled supporting surfaces 45 will be spaced from the second portion 37 of the outermost one of the angled abutment surfaces. When the insert 25 is indexed by being turned 180° around its axis IA, the insert will look substantially the same, except that first surface portion 63 of the second angled supporting surface 45 will abut the first portion 35 of the radially innermost angled abutment surface 33 and the second surface portion 65 of the first angled supporting surface 45 will abut the first surface portion 35 of the radially outermost angled abutment surface 33.

Figure 6A:
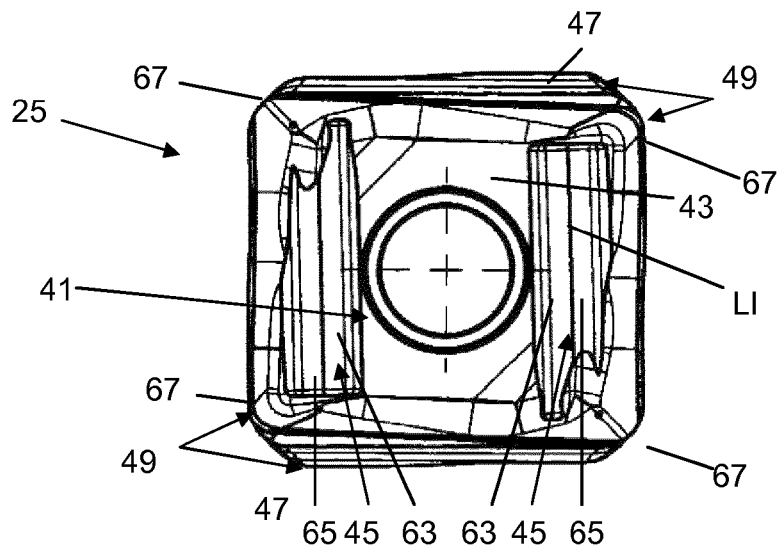
FIG. 6A is a top view of a cutting insert according to an aspect of the present invention.
Figure 6B:
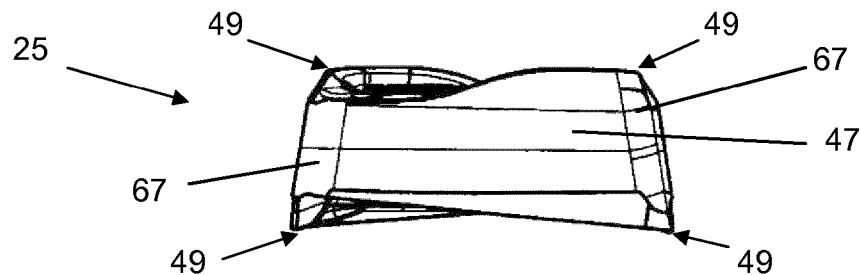
FIG. 6B is a view of the cutting insert of FIG. 6A turned 90°.
Figure 6C:
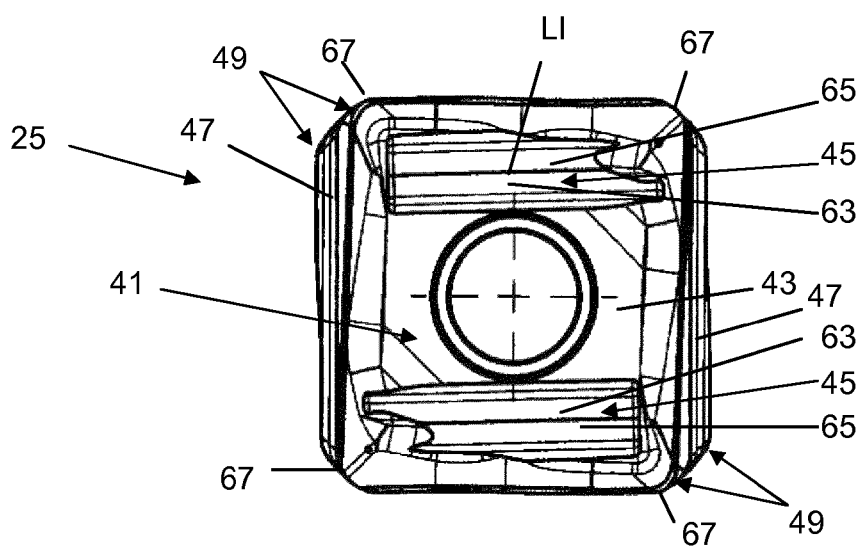
FIG. 6C is a view of the cutting insert of FIG. 6A turned 90° from FIG. 6B and 180° from FIG. 6A.

As seen with reference particularly to FIGS. 6A-6C, the two supporting surfaces 41 can be oriented at 90° angles relative to each other, i.e., the lines of intersection LI between the surface portions 43 and the angled supporting surfaces 45 are perpendicular to each other. In this way, where the four side surfaces 47 define four corners 67, the cutting insert 25 can have four cutting corners 49. Two cutting corners 49 of the four cutting corners are disposed at two diagonally opposite corners of the insert, on opposite sides of the insert. It will be appreciated that an insert with four side surfaces and four corners might also have eight cutting corners, and that other insert designs involving more or fewer side surfaces, corners, and cutting corners can be provided In the illustrated toolholder 23, the bottom surface 31 defines a negative, positive, or zero axial holding angle $\alpha$, and the insert 25 comprises a radial cutting edge 51 and rake surface 61 shaped so that, when the insert is received in the at least one pocket, the rake surface along the radial cutting edge is held at a positive rake angle. By providing a tool 21 wherein a positive rake angle is provided along the radial cutting edge 51, the insert 25 can provide good cutting characteristics. This can be coupled with the provision of an acute angle $\Sigma$ (FIG. 5B) between the first one of the four side surfaces 47 and the plane PSS of the surface portion 43 of the supporting surface 41, which can further facilitate cutting.

While the present invention has been described primarily in terms of its use with rotating tools, persons skilled in the art will appreciate that turning tools can benefit from aspects of the present invention, as well. For example, where a turning tool has a toolholder with an abutment surface that defines a negative holding angle relative to the rotating workpiece, the abutment surface of the toolholder and the corresponding supporting surface of the insert to be mounted on the toolholder can be provided with angled abutment and angled supporting surfaces. Such a structure help distribute forces that would otherwise act on a bolt holding the insert to the toolholder.

It has herein been solved how to provide a cutting tool with an insert receiving pocket having a bottom surface oriented at a negative holding angle while minimizing a risk of damage to a screw that holds an insert in the pocket.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

The disclosures in EP Patent Application No. 12151084.6, from which this application claims priority, are incorporated herein by reference.

What is claimed is:

1. A cutting insert, comprising
two supporting surfaces; and
four side surfaces disposed between the two supporting surfaces, each side surface of the four side surfaces intersecting with two other side surfaces of the four side surfaces to form four corners, the four side surfaces intersecting with the two supporting surfaces to form, at two of the four corners four cutting corners, each cutting corner including a first and a second cutting edge component, and to form, at two other ones of the four corners, four non-cutting corners, wherein each supporting surface includes a surface portion and an angled supporting surface, a plane of the angled supporting surface intersecting with a plane of the surface portion along a line of intersection and forming a non-zero angle with the plane of the surface portion, wherein the line of intersection on a first one of the two supporting surfaces is substantially perpendicular to the line of intersection on a second one of the two supporting surfaces.

2. The cutting insert as set forth in claim 1, wherein the plane of each surface portion forms an obtuse angle with two of the four side surfaces.

3. The cutting insert as set forth in claim 1, wherein the plane of each surface portion forms an acute angle with two of the four side surfaces.

4. The cutting insert as set forth in claim 1, wherein a wedge angle at each of the first and second cutting edge components is an acute angle.

5. The cutting insert as set forth in claim 1, wherein the angled supporting surface comprises a first surface portion that defines with the plane of the surface portion a supporting surface angle and a second surface portion that defines with the plane of the surface portion a second angle that is different from the supporting surface angle.

6. The cutting insert as set forth in claim 5, wherein the second angle is equal to 180° minus the supporting surface angle.

7. The cutting insert as set forth in claim 1, further comprising at least two angled supporting surfaces in the surface portion, the at least two angled supporting surfaces being oriented at least at one angle relative to the surface portion and being parallel and spaced apart about a center of the cutting insert.

8. The cutting insert as set forth in claim 7, wherein the at least two angled supporting surfaces are oriented at the same angle relative to the surface portion.

9. A toolholder for a rotating cutting tool, comprising:
a toolholder body having a longitudinal axis;
at least one cutting insert receiving pocket in the toolholder body, the at least one pocket including at least one bottom surface, the at least one bottom surface being oriented at a negative holding angle, said pocket having at least two non-parallel side abutment surfaces that forms a non-zero angle with the at least one bottom surface; and
at least one angled abutment surface in the at least one bottom surface, the at least one angled abutment surface and the at least one bottom surface being oriented at a non-zero abutment surface angle relative to each other, and in that the abutment surface angle is substantially equal to or greater than, and opposite from, a holding angle at which the at least one bottom surface is oriented so that the at least one angled abutment surface is oriented at a substantially neutral or positive holding angle.

10. The toolholder as set forth in claim 9, further comprising a hole extending into the at least one bottom surface at an angle substantially perpendicular to a plane of the bottom surface.

11. The toolholder as set forth in claim 9, wherein the at least one bottom surface defines a negative radial holding angle with the longitudinal axis, and in that the abutment surface angle is substantially equal to or greater than, and opposite from, the negative holding angle at which the at least one bottom surface is oriented so that the at least one angled abutment surface is oriented at a substantially neutral or positive holding angle.

12. A cutting tool comprising
a toolholder for a rotating cutting tool including a toolholder body having a longitudinal axis, at least one cutting insert receiving pocket in the toolholder body, the at least one pocket having at least one bottom surface, the at least one bottom surface being oriented at a negative holding angle, and a cutting insert mounted in the cutting insert receiving pocket, the cutting insert including at least one supporting surface facing the at least one bottom surface,
wherein the toolholder comprises at least one angled abutment surface in the at least one bottom surface and in that the insert at least one surface portion and at least one angled supporting surface in the at least one supporting surface, the at least one angled abutment surface and the at least one bottom surface being oriented at a non-zero abutment surface angle relative to each other, and the at least one angled supporting surface and the at least one surface portion being oriented at a non-zero supporting surface angle relative to each other, the at least abutment surface angle and the at least one supporting surface angle being equal, and in that the abutment surface angle is substantially equal to or greater than, and opposite from, a holding angle at which the at least one bottom surface is oriented so that the at least one angled abutment surface is oriented at a substantially neutral or positive holding angle.

13. The cutting tool as set forth in claim 12, wherein the at least one bottom surface defines a negative radial holding angle with the longitudinal axis, and in that the abutment surface angle is substantially equal to or greater than, and opposite from, the negative holding angle at which the at least one bottom surface is oriented so that the at least one angled abutment surface is oriented at a substantially neutral or positive holding angle.

14. The cutting tool as set forth in claim 12, wherein the insert has at least one cutting corner and is mounted in the pocket so that one cutting corner is in a working position, the cutting corner in the working position including an axially extending edge portion and a radially extending edge portion, the insert being formed and mounted such that at least portions of the at least one supporting surface inward of the axially extending edge portion and the radially extending edge portion form positive axial and radial rake angles.

15. The cutting tool as set forth in claim 12, wherein the insert has a plane of the at least one surface portion that forms an obtuse angle with a clearance surface of the insert adjacent at least one of the axially extending edge portion and the radially extending edge portion.

* * * * *